US012175893B2

(12) United States Patent
Wallis

(10) Patent No.: US 12,175,893 B2
(45) Date of Patent: Dec. 24, 2024

(54) DESIGNER HOME DÉCOR MESSAGING SYSTEM AND METHOD OF MANUFACTURE

(71) Applicant: Apryll Wallis, Houma, LA (US)

(72) Inventor: Apryll Wallis, Houma, LA (US)

( * ) Notice: Subject to any disclaimer, the term of this patent is extended or adjusted under 35 U.S.C. 154(b) by 142 days.

(21) Appl. No.: 17/862,793

(22) Filed: Jul. 12, 2022

(65) Prior Publication Data

US 2023/0128307 A1 Apr. 27, 2023

Related U.S. Application Data

(60) Provisional application No. 63/270,148, filed on Oct. 21, 2021.

(51) Int. Cl.

*G09F 23/00* (2006.01)
*A47G 9/02* (2006.01)
*A47G 9/10* (2006.01)

(52) U.S. Cl.

CPC ............ *G09F 23/00* (2013.01); *A47G 9/0223* (2013.01); *A47G 9/10* (2013.01)

(58) Field of Classification Search

CPC .......... G09F 23/00; A47G 9/0223; A47G 9/10
See application file for complete search history.

(56) References Cited

U.S. PATENT DOCUMENTS 4,309,784 A * 1/1982 Cohen ..................... G09F 23/00 5/639
D354,651 S * 1/1995 Fitzpatrick ..................... D6/601
D692,687 S * 11/2013 Campbell ...................... D6/330
2006/0260048 A1* 11/2006 Turbe ....................... A47G 9/10 5/490

OTHER PUBLICATIONS

"DIY Pom Pom Pillow with Text," https://www.butfirstcoffeeblog.com/diy-pom-pom-pillow-text/, Feb. 13, 2017. (Year: 2017).*
"Zoey's Attic," https://web.archive.org/web/20201030131548/https://www.zoeyspersonalizedgifts.com/products/i-love-you-to-the-moon-and-back-custom-throw-pillow-with-pillowcase.html, Oct. 30, 2020. (Year: 2020).*
"How to Print Fabric With an Inkjet Printer and a DIY Colorfast Recipe," https://web.archive.org/web/20210509114247/https://www.instructables.com/How-To-Print-Fabric-with-an-Inkjet-Printer-and-a-D/ (Year: 2021).*

* cited by examiner

*Primary Examiner* — Gary C Hoge
(74) *Attorney, Agent, or Firm* — Brennan, Manna & Diamond, LLC

(57) ABSTRACT

The present invention relates to a designer home décor messaging system including a pair of designer soft textile articles for decoration and providing a way of communication between two users. A first article of the set has a printed customized question phrase, and a second article has at least one and potentially two response phrases corresponding to the question phrase. The first article can be displayed to ask the question and a panel of the second article can be displayed to respond to the question. The second article can be flipped to respond to the question with a different response. The phrases can be in any language, font, style and design. The system can also be in the form of covers for the articles having customized phrases.

6 Claims, 6 Drawing Sheets

DESIGNER HOME DÉCOR MESSAGING SYSTEM AND METHOD OF MANUFACTURE

CROSS-REFERENCE TO RELATED APPLICATION

The present application claims priority to, and the benefit of, U.S. Provisional Application No. 63/270,148, which was filed on Oct. 21, 2021, and is incorporated herein by reference in its entirety.

FIELD OF THE INVENTION

The present invention relates generally to the field of home décor. More specifically, the present invention relates to a novel designer pillow system including a pair of designer pillows with each pillow having custom phrases printed on them. One pillow of the pillow system has a polar question on one of panels and the other pillow has two responses to the polar question printed on the panels. The pair can be used together to initiate conversation, break the ice and/or play a game. Accordingly, the present disclosure makes specific reference thereto. Nonetheless, it is to be appreciated that aspects of the present invention are also equally applicable to other like applications, devices, and methods of manufacture.

BACKGROUND

By way of background, home décor, such as a pillow, cushion, blanket, rug and other textile intended to provide interest in a space come in various forms. A pillow could be a sleeping pillow, neckroll pillow, throw pillow, decorative pillow and other soft textile. A sleeping pillow for example, provides support for the head or other parts of the body, and is used while sleeping, resting, sitting, or reclining. A decorative pillow (also referred to as throw pillow) is used for interior design and is generally placed on armchairs, sofas, beds and other furniture. Neckroll pillows are used for providing support to the neck of a user while sleeping or lounging. Pillows, blankets, cushions, rugs and the like typically include a fabric or textile layer and with home décor, such as pillows and cushions, the fabric or textile creates an envelope that contains a soft cushioning stuffing. However, all the conventional pillows are used for only their general use of providing decoration or use while sleeping, resting and relaxing.

Many people enjoy games like pillow fighting and using pillows for sitting, however, such games can damage pillows, and may also cause injury to users. People desire pillows that can be used in different ways, and that can be enjoyed by everyone.

Married couples or family members who are upset with each other do not generally talk when they fight. However, one or both want to break ice and talk but are hesitant to initiate a conversation. Having home décor such as a pair of pillows having customized phrases can be used as ice breakers for initiating conversations and therefore people desire home décor, such as pillows, that can be used for asking a question and responding to a query.

Therefore, there exists a long-felt need in the art for home décor, such as designer pillows, that have custom phrases printed, imaged, sewn or otherwise applied on a surface of the home décor item. There is also a long-felt need in the art for home décor that can be used for asking a question and for responding to a customized question. Additionally, there is a long-felt need in the art for home décor, such as designer pillows, which can be used by couples, family members and others for initiating conversations. Moreover, there is a long-felt need in the art for improved home décor that can be used for playing conversational and other games. Further, there is a long-felt need in the art for home décor that in one embodiment, has a pair of articles such as pillows with one article or pillow having a polar question printed or imaged on a surface of the article or pillow and the other, or second article or pillow, having a couple of answers to the question on the first pillow or article. Furthermore, there is a long-felt need in the art for designer home décor, such as pillows or other soft textiles, that offer a simple and unique way to add decoration to any home, office and other place where people may congregate. Finally, there is a long-felt need in the art for an article of home décor, such as a pillow set or other soft textile items, having entertaining designs, messages, text, symbols and other writings and illustrations on them.

The subject matter disclosed and claimed herein, in one embodiment thereof, comprises a designer home décor system. The home décor system has a pair of articles, such as pillows, with decorative illustrations, personalized texts and custom phrases printed or imaged on the articles. One article allows users to ask a question and the second article displays an answer, or other portion of the phrase. The home décor system further includes a pair of articles including a first article such as a soft textile item and a second article such as a soft textile item. The articles have substantially the same size and design, each article having a front panel and a rear panel and a cavity therebetween which may for example, accommodate a soft-cushioning material. The front panel of the first article has a customized question printed, imaged or applied thereon, the front panel of the second article has a first customized answer printed, imaged or applied thereon for the customized question, the rear panel of the second article has a second customized answer printed, imaged or applied thereon for the customized question. The first article is displayed to ask the printed question and the second article is displayed to respond to the question.

In this manner, the designer home décor of the present invention accomplishes all of the foregoing objectives and provides users with a pair of custom designer articles, such as pillows, with decorative and custom phrases, symbols or images printed on them. The pair of articles allows a user to use at least one article to ask the question printed on the item and allows another user to respond to the question using the second article having different answers printed on opposite sides or surfaces of the second article thereby allowing users to break the ice, initiate conversation, play games and engage in other activities. The article set also offers a simple and unique way to add decoration to any home, office, and other place where people gather.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a designer home décor system. The designer home décor system further includes a pair of articles including a first article and a second article. The articles have substantially the same size and design, but may be of any size or shape, and each article has a front panel or surface and a rear panel or surface and a cavity therebetween which may be used for accommodating a soft-cushioning material, such as in the case of a pillow or cushion. The front panel of the first article having a customized question printed, imaged or applied thereon. The front panel of the second article has a first customized answer printed, imaged or applied thereon for the customized question, text or symbol. The rear panel of the second article has a second customized answer printed, imaged or applied thereon for the customized question, text or symbol.

In yet another embodiment, the front panel and the rear panel of each of the articles are sewn, fused or secured together around their periphery forming the cavity for receiving and accommodating the soft cushioning material.

In yet another embodiment, a closure is positioned along a portion of the periphery for creating an opening to insert and remove the soft cushioning material.

In yet another embodiment, a closure is one of a zipper, or a hook and loop fastener.

In yet another embodiment, the customized phrases have built in LEDs that illuminate when the pillow is pressed from both the front panel and the rear panel.

In yet another embodiment the phrase or symbol is created using braille or other textual indicators on the surface.

In yet another embodiment, a pair of custom designer pillows configured to be used for asking a question and for responding to the question is disclosed. The pair includes a first pillow and a second pillow, the first pillow having a question or phrase disposed thereon. The second pillow has a response disposed on each of the opposite surfaces and the responses are different and correspond to the question of the first pillow. The first pillow is shown by a user for asking a question and the second pillow is shown by another user for responding to the question. The second pillow can be flipped to show the other response disposed on the opposite surface.

In yet another embodiment, the first pillow and the second pillow are of substantially same size and design.

In yet another embodiment, the question and the responses are printed in 2-D print or 3-D print.

In yet another embodiment, a method of interacting between two individuals using a pair of decorative articles is described. The method comprises the steps of providing a pair of decorative articles, wherein the pair includes a first article having a question printed, imaged or scanned on the front surface thereof, and a second article having a first response printed on a front surface thereof and having a second response printed on a rear surface thereof. The method further comprises the steps of asking or presenting the question printed on the front surface of the first article by a first user to a second user by showing the front surface of the article. Then, responding to the question with a response, by the second user by showing either the front surface or the rear surface of the second article.

In yet another embodiment, the method includes the step of flipping the second article by the second user to change the response for the question.

In yet another example of the present invention, a pair of pillowcases or covers are disclosed. A first pillowcase or cover has a printed question, and a second pillowcase or cover has a response on each of two opposite surfaces. The covers are configured to cover a pair of pillows or other associated home décor and make the pillows or home décor as designer pillows or articles, wherein the same can be used for asking and responding to a question.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1A:
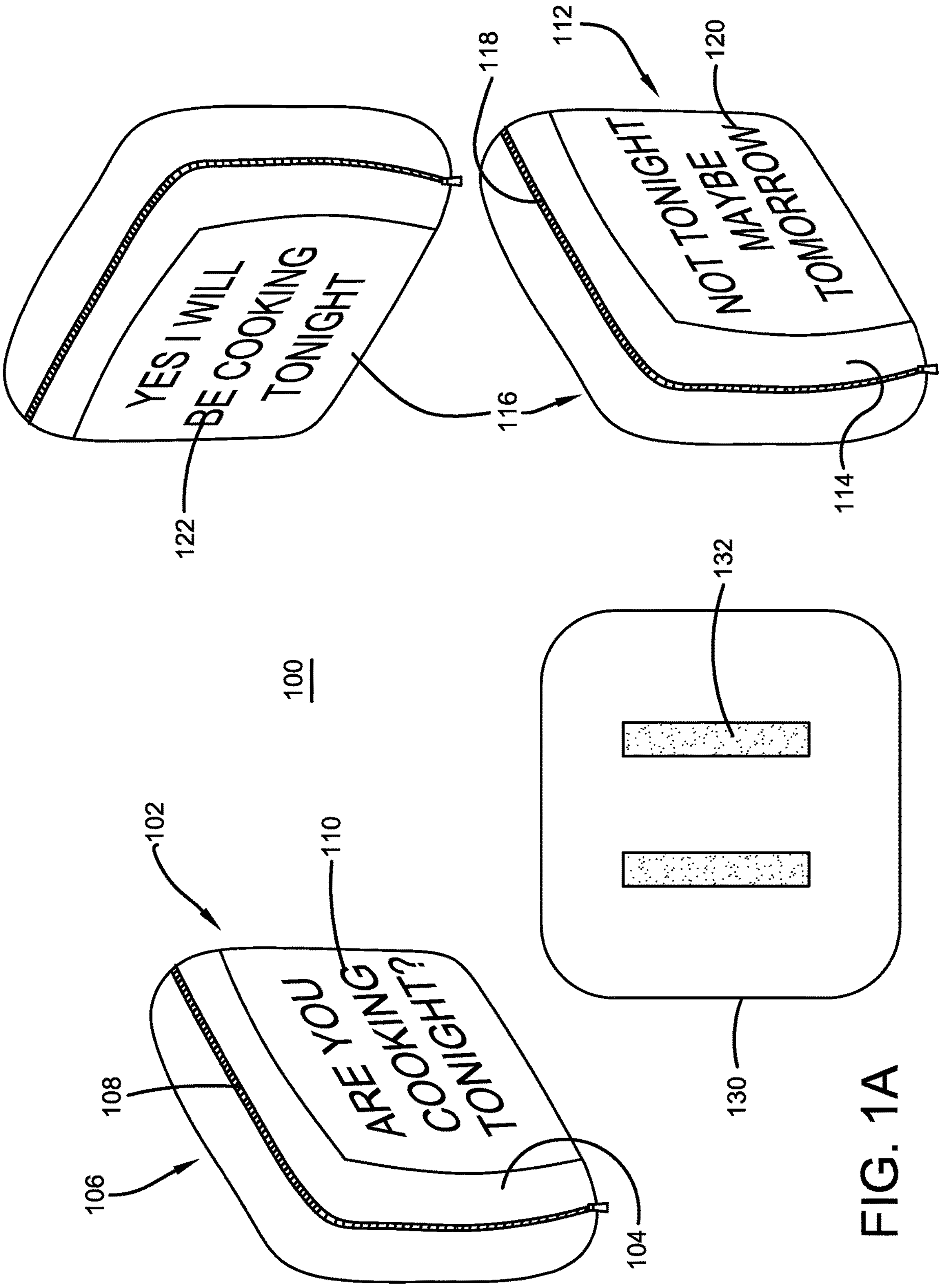
FIG. 1A illustrates a perspective view of one potential embodiment of the designer home décor articles of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for textile articles that have custom phrases or symbols printed, applied, affixed, sewn or otherwise attached to the textile article by any combination affixing or application methods. There is also a long-felt need in the art for designer textile articles such as pillows, cushions, rugs, blankets and other soft textiles that can be used for asking a question and for responding to a customized question with a message that is responsive to the first question. Additionally, there is a long-felt need in the art for designer soft textiles that can be used by couples, family members and more for initiating conversations. Moreover, there is a long-felt need in the art for improved soft textiles and home décor that can be used for playing conversational and other games. Further, there is a long-felt need in the art for a soft textile or home décor, such as a pillow set, that has a first and second article with the first article having a question printed, imaged, applied affixed or attached thereto, and the second article having one or more responsive answers to the question. There is also a long-felt need in the art for designer home décor that offers a simple and unique way to add decoration to any home, office and more. Finally, there is a long-felt need in the art for a home décor set having a pair of articles that have entertaining designs, symbols, tactile elements, and writings on them.

The present invention, in one exemplary embodiment, is a novel pair of custom designer articles such as pillows, that are configured to be used for asking a question and for responding to the question in a responsive manner. The pair includes a first article and a second article, the first article having a question phrase printed, imaged, applied, or otherwise affixed thereon, the second article having a response printed, imaged, applied or otherwise affixed on each of the opposite surfaces such that the responses are different and correspond, or are responsive to, the question provided on the first article. The first article is shown by a user for asking the question and the second article is shown by another user for responding to the first question. The second article can be flipped to show the other response printed on the opposite surface of the second article.

Referring initially to the drawings, FIG. 1A illustrates a perspective view of one potential embodiment of the designer home décor 100 of the present invention in accordance with the disclosed specification. The designer articles 100 are designed as a pair of articles such as pillows, cushions, rugs, blankets and other soft textiles of various sizes and colors and each article has customized phrases printed on them. More specifically, a first article 102 has a front or first side 104 and a rear or second side 106. The front or first side 104 and the rear or second side 106 are sewn or otherwise attached together around their periphery to form an internal cavity which may be used to receive and accommodate a soft cushioning material like foam. A closure 108 like a zipper, hook and loop fastener and combinations thereof is positioned along a portion of the periphery for creating an opening and, in certain embodiments, to insert and remove the soft cushioning material (not shown) inside the pillow or home décor article as per preferences of a user. The front panel/side 104 of the first article 102 has a customized phrase 110 applied thereon and the customized phrase 110 is specifically in the form of a question or statement. The customized question 110 can also be sewn, applied by heat transfer, messages or letters can be attached by hook and loop fasteners 132 to the surface of the soft textile article 130 so that they can be removed and changed, on the front side 104 of the first article 102. The front panel 104 of the first article 102 is shown or displayed by a user to another user to ask the question printed on the front side 104 without orally asking. The printed question 110 can be a polar question or can alternatively be a WH-question.

A second article 112 of the pair of articles 100 is of substantially same size and design as of the first article 112. The second article 112 also has a front panel 114 and a rear panel 116. The front side 114 and the rear side 116 are sewn or otherwise affixed together around their periphery to form an internal cavity to receive and accommodate a soft cushioning material like foam. The second article 112 also has a closure 118 for creating an opening to insert and remove the cushioning material. The second article 112 has customized phrases applied on both the front side 114 and the rear side 116 as answers to the question 110 of the first article 102. The messages may be applied by conventional printing such as ink-jet printing, toner fusing, adaptive printing, heat seal or heat transfer applications and may also be handwritten or sewn. Preferably, the front side 114 has a negative answer phrase 120 and the rear side 116 has a positive answer phrase 122 in response to the polar question 110. Based on the mood and preferences of a user of the article, any of the front or rear side of the second article 112 can be shown as a response to the question or message applied on the front side 104 of the first article 102. Primarily, the answers 120, 122 are different and related answers for the question 110.

The customized phrase, question, or message 110 on the front side 104 of the first article 102 and the customized responses 120, 122 of the second article 112 can have 2-D print or 3-D print. The pillows 102, 112 can be of any shape and size and where the article is a pillow then the pillow can come as sleeping pillows, neckroll pillows and decorative pillows and therefore, is suitable for use as a headrest when sleeping or resting or as a support when sitting, sleeping, or reclining. Each pillow can have dimensions of 20"×25", 20"×20", 18"×18", 6.5"×13" and more.

The front panels and the rear panels of both the articles can be made of cotton, polyester, a cotton/polyester blend, silk, or other selected textile material or combination of selected textile materials commonly used for the home décor. The soft textiles have a thread count ranging from between 50 and 400 threads per inch and preferably between 100 and 300 threads per inch.

Those having regard for the art will readily appreciate that an exemplary customized soft textile system 100 is disclosed, which enables a user to selectively hold a first article 102 having a question, message or symbol printed thereon to pose the question to another user and another user can hold the second article 112 to respond to the question as per their preferences. The article system 100 functions as a fun way of communication between users in addition to providing conventional functions of being used for decoration and providing comfort.

Furthermore, the home décor system 100 is constructed and arranged in accordance with the principle of the invention and must incorporate at least two articles having a polar question and corresponding two answers.

Figure 1B:
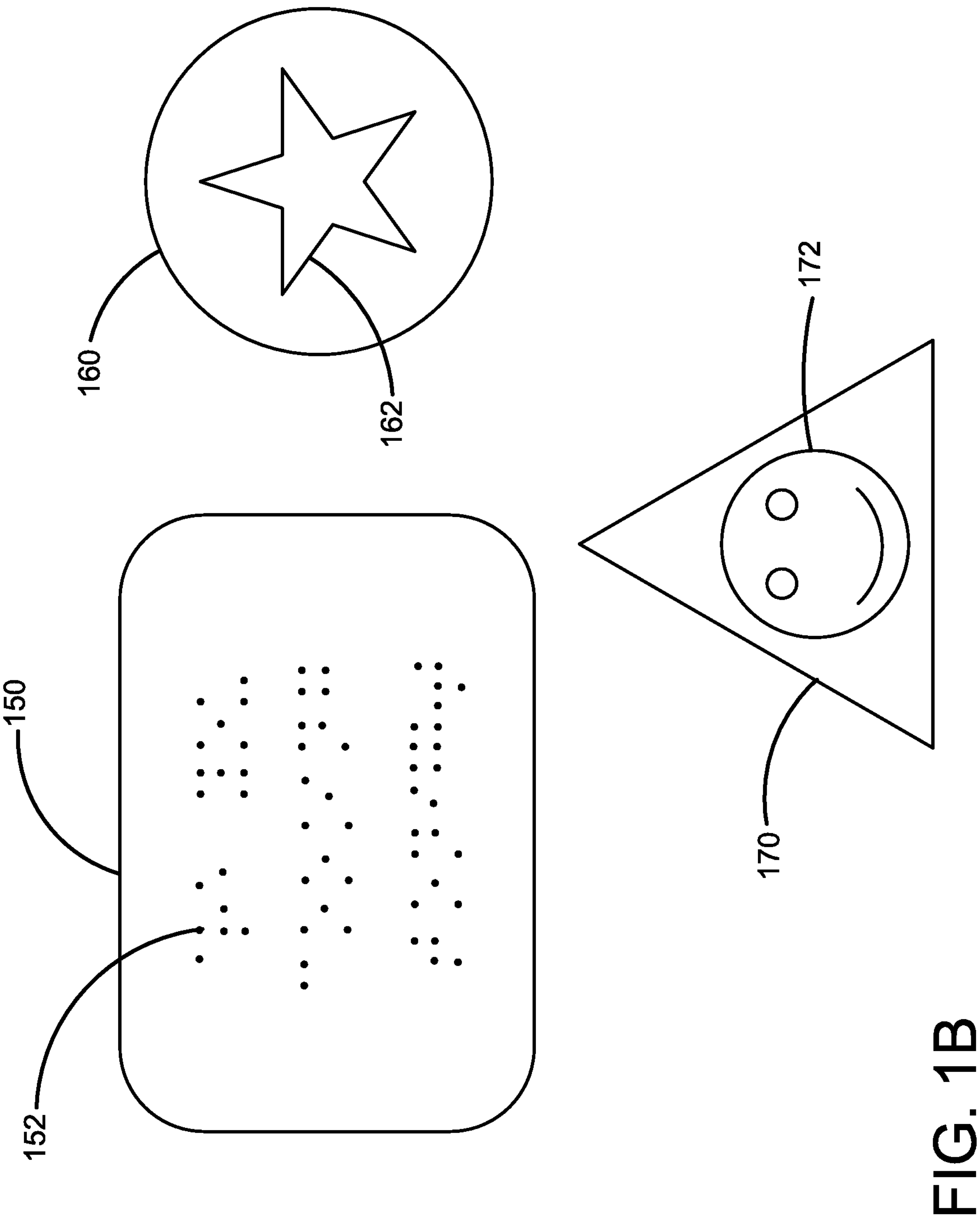
FIG. 1B illustrates a perspective view of an article having textual indica printed, imaged or applied on a surface of one potential embodiment of the home décor article of the present invention in accordance with the disclosed architecture.

FIG. 1B provides a front view of several soft textile articles 150, 160 and 170 showing different shapes and different soft textile articles, rugs, blankets, pillows, cushions and other soft textile items. Article 150 is shown with a tactile pattern 152, such as braille so that visually impaired individuals can enjoy the use of the invention. Articles 160 and 170 have a different shape and include symbols 162 and 172 which may be used in response to a question that has been posed.

Figure 2:
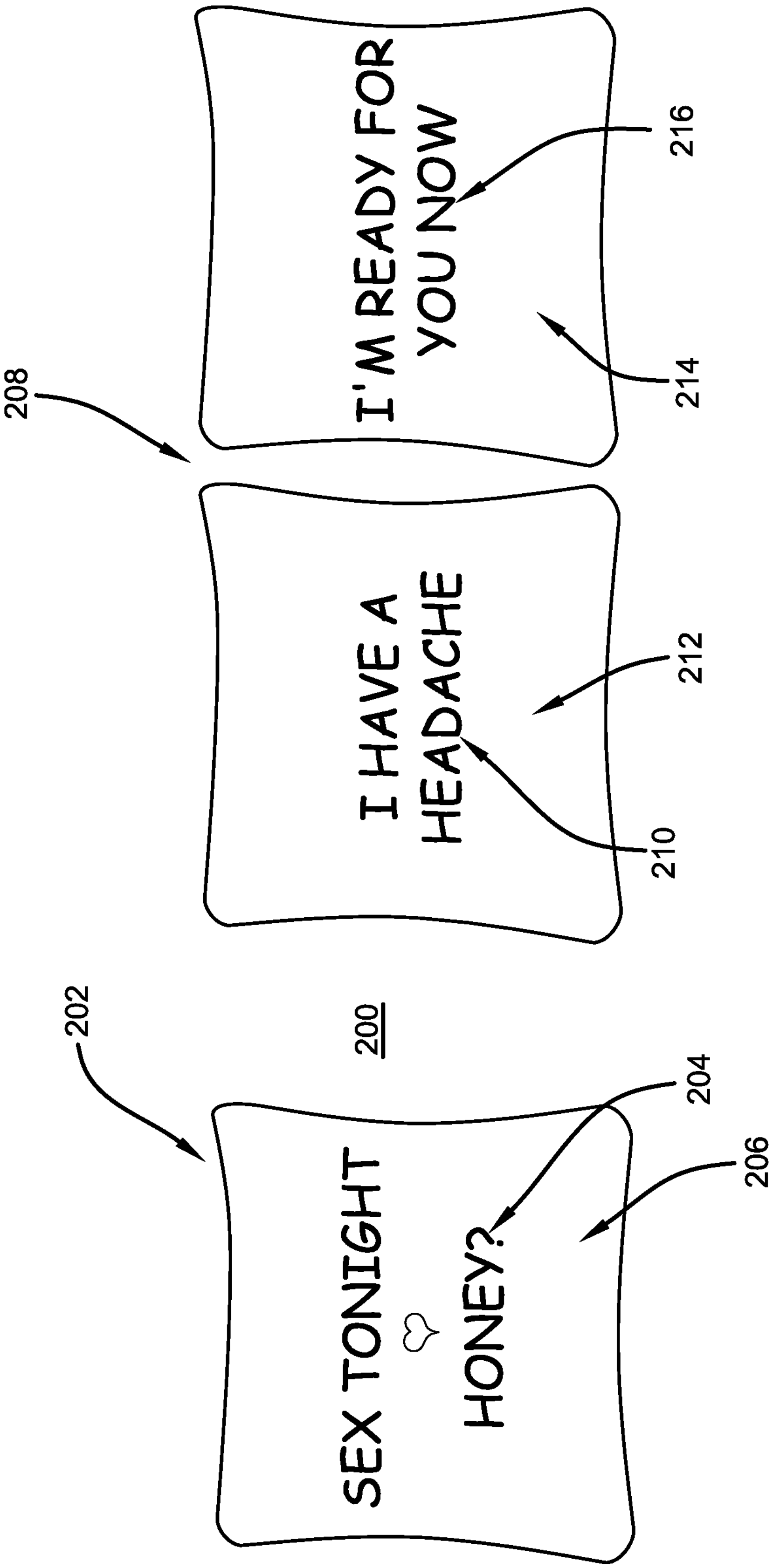
FIG. 2 illustrates another potential embodiment of the home décor communication system showing a question and a response on separate articles in accordance with the disclosed architecture.

FIG. 2 illustrates another embodiment of the article messaging system showing a question and responses on separate articles such as pillows in accordance with the disclosed specification. As illustrated, the first article or pillow 202 has a printed question 204 "Sex tonight honey" on the front surface 206. The first article or pillow 202 can be of any conventional shape and size and can be used as a sleeping pillow, decorative pillow and more. A second article or pillow 208 has a response 210 "I have a headache" on the front surface 212 that can be displayed as a response to the printed question 204. Also, the rear surface 214 of the second pillow 208 can have a second response 216, different than the first response "I am ready now are you" that can be displayed as a response to the printed question 204.

Figure 3:
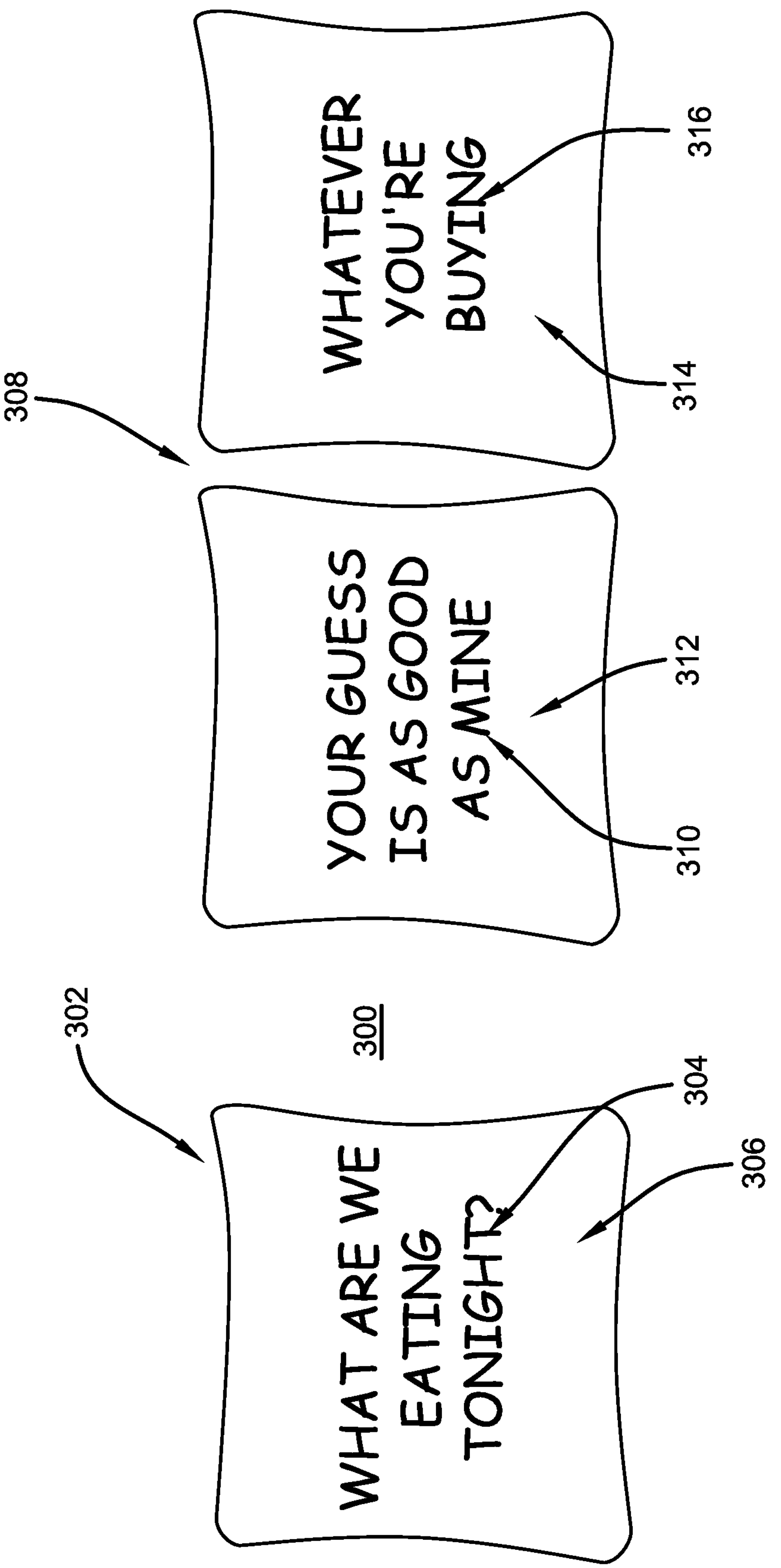
FIG. 3 illustrates yet another potential embodiment of the home décor communication system showing a question and a response on separate articles in accordance with the disclosed architecture.

FIG. 3 illustrates yet another embodiment of the article messaging system showing a question and responses on separate articles or soft textiles such as a pillow or cushion in accordance with the disclosed specification. As illustrated, the first article 302 has a printed question 304 "What are we eating tonight" on the front surface 306. The first article 302 can be of any conventional shape and size and can be used as a sleeping pillow, decorative pillow and more. A second article 308 has a response 310 "Whatever you are buying" on the front surface 312 that can be displayed as a response to the printed question 304. Also, the rear surface 314 of the second article 308 can have a second response 316 "Your guess is as good as mine" that can be displayed as a response to the printed question 304.

Figure 4:
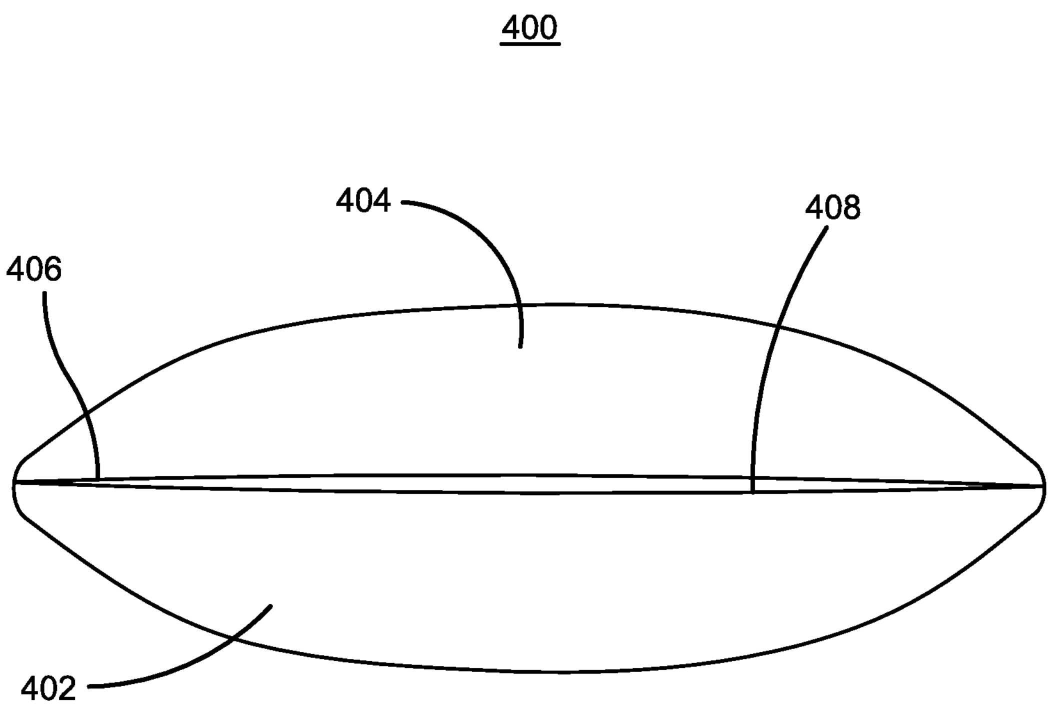
FIG. 4 illustrates a detailed view of one potential embodiment of a designer pillow of the present invention in accordance with the disclosed architecture.

FIG. 4 illustrates a detailed view of a designer home décor messaging system of the present invention in accordance with the disclosed specification. The exemplary designer home décor messaging system 400 can be any home décor of the home décor messaging system described in other embodiments of the present invention and can have printed customized text, phrases, messages, symbols, tactile areas and combinations thereof in any font, color, language and style. More specifically, the home décor article 400 has a front panel 402 and a rear panel 404. The panels 402, 404 are similar in texture, size and thickness. The panels 402, 404 can be of same color and can have same design. Alternatively, the color and design of the panels 402, 404 can be different.

The closure 406 is used for accessing the cavity 408 disposed between the panels 402, 404 and is used for storing cushioning materials. The customized phrases can be any phrase as per preferences of different occasions and requirements of users.

The pillows of the present invention are machine washable and/or can be cleaned by a vacuum cleaner and come in various forms like weatherproof, tear-resistant and more. In one embodiment of the present invention, the customized phrases can have built in LEDs that illuminate when the pillow is pressed from both the front panel and the rear panel. There is no limit to the customized phrases printed on the pillows and the phrases are not necessarily in the form of a question and answer.

Figure 5:
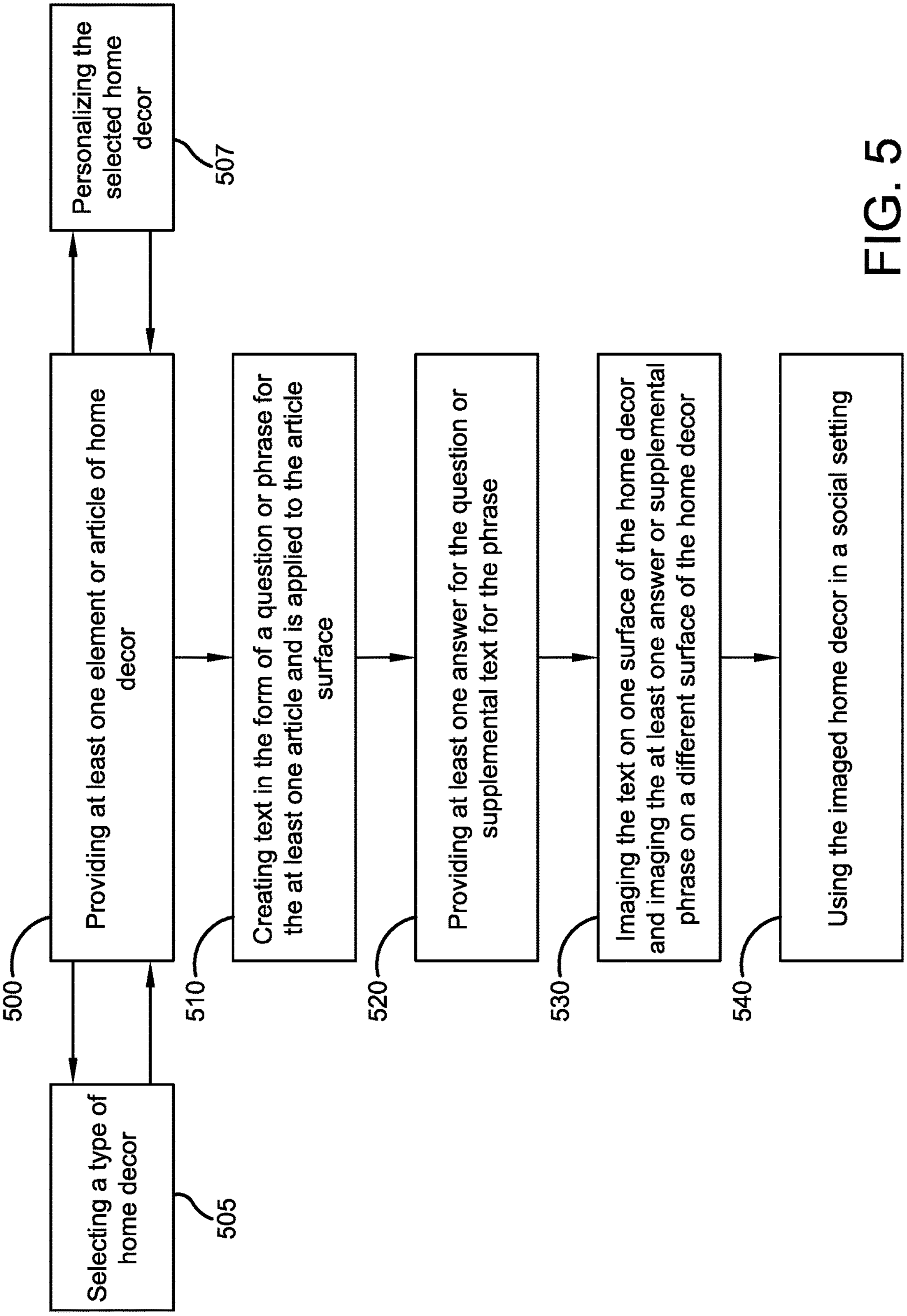
FIG. 5 illustrates a block diagram setting forth an exemplary method of creating one potential embodiment of a home décor communication system of the present invention in accordance with the disclosed architecture.

FIG. 5 shows a block diagram for a method of making a home décor communication system and includes the steps of initially providing at least one article of a home décor system at step 500. The article or element may be any soft textile item such as a pillow, cushion, rug, blanket or other décor which may appear in an area where people gather. The type of home décor is selected at step 505 and may be personalized at step 507 such as by selecting the color, font size, images, phrases, texture, fringes, and the like. At step 510 the message is created and applied to the surface of the article. Next, at step 520 a responsive answer, text, symbol or the like is created and applied to a surface of the article or a second article if a multiple article set has been selected as part of the home décor communication system. The question and answers are then imaged on the surface of the articles at step 530. The imaging can occur by printing, sewing, fusing, heat affixing or other suitable process for creating the message on the surface of the object. Finally, at step 540 the home décor messaging system is use in a social setting.

It should be noted that the present invention provides pillowcase covers having the customized phrases as described in the other embodiments to convert existing pillows into designer pillows having customized phrases. The pillowcase covers are made in a variety of shapes and sizes to cover the conventional pillows and enhancing their functionality and appearance.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "designer pillow system", "pillow system", "designer pillows", and "designer pillows with custom phrases" are interchangeable and refer to the designer pillow system 100,200,300 of the present invention.

Notwithstanding the foregoing, the designer pillow system 100,200,300 of the present invention can be of any suitable size and configuration as is known in the art without affecting the overall concept of the invention, provided that it accomplishes the above-stated objectives. One of ordinary skill in the art will appreciate that the designer pillow system 100,200,300 as shown in the FIGS. are for illustrative purposes only, and that many other sizes and shapes of the designer pillow system 100,200,300 are well within the scope of the present disclosure. Although the dimensions of the designer pillow system 100,200,300 are important design parameters for user convenience, the designer pillow system 100,200,300 can be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A designer pillow system comprising:

a first pillow comprised of a first side, a second side attached around a periphery forming a cavity between the first and second sides, the periphery comprising a closure positioned along a portion of the periphery, and a first 3-D printed tactile message removably attachable to one of the first and second sides of the first pillow via a fastener, wherein the first message is a question; and a second pillow comprised of a first side, a second side attached around a periphery forming a cavity between the first and second sides, the periphery comprising a closure positioned along a portion of the periphery, and a second 3-D printed tactile message removably attachable to one of the first and second sides of the second pillow via a fastener, wherein the second message is distinct from, and responsive to, the first message.

2. The designer pillow system as recited in claim 1, wherein each of the first and second pillows is comprised of a cotton, a polyester, a cotton/polyester blend, a silk or a combination of textile materials.

3. The designer pillow system as recited in claim 2, wherein each of the first and second pillows have a thread count ranging between 50 and 400 threads per inch.

4. The designer pillow system as recited in claim 3, wherein each of the first and second pillows have a thread count ranging between 100 and 300 threads per inch.

5. A method of making a designer soft textile messaging system, comprising the steps of:

providing at least one article of home décor;

personalizing the at least one article of home décor;

creating a text or a message for a first side of the at least one article;

providing a responsive answer to the text or message;

attaching the text or message to the first surface of the at least one article and the responsive answer to another surface of the at least one article;

removing the responsive answer from the another surface of the at least one article and replacing the responsive answer with a different responsive answer;

using the at least one article in a social setting; and using the at least one article of home décor to illuminate the text, the message, or the responsive answer.

6. The method of making a designer soft textile messaging system as recited in claim 5 further comprising a step of selecting a type of article of home décor after the step of providing.

* * * * *